US012757075B2

(12) United States Patent
Sun et al.

(10) Patent No.: US 12,757,075 B2
(45) Date of Patent: Oct. 6, 2026

(54) SN SWITCHING METHOD FOR DATA TRANSMISSION AND APPARATUS, AND STORAGE MEDIUM

(71) Applicants: China Mobile Communication Co., Ltd Research Institute, Beijing (CN); China Mobile Communications Group Co., Ltd., Beijing (CN)

(72) Inventors: Junshuai Sun, Beijing (CN); Guangyi Liu, Beijing (CN); Yingying Wang, Beijing (CN); Na Li, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 771 days.

(21) Appl. No.: 18/248,248

(22) PCT Filed: Oct. 8, 2021

(86) PCT No.: PCT/CN2021/122714
§ 371 (c)(1),
(2) Date: Apr. 7, 2023

(87) PCT Pub. No.: WO2022/073487
PCT Pub. Date: Apr. 14, 2022

(65) Prior Publication Data

US 2023/0379762 A1 Nov. 23, 2023

(30) Foreign Application Priority Data

Oct. 9, 2020 (CN) ......................... 202011073084.3

(51) Int. Cl.
*H04W 28/22* (2009.01)
*H04W 28/02* (2009.01)

(52) U.S. Cl.
CPC ....... *H04W 28/22* (2013.01); *H04W 28/0278* (2013.01)

(58) Field of Classification Search
CPC .......................... H04W 28/22; H04W 28/0278
See application file for complete search history.

(56) References Cited

U.S. PATENT DOCUMENTS

2006/0007856 A1 1/2006 Berghoff
2012/0314562 A1 12/2012 Zhao et al.
(Continued)

FOREIGN PATENT DOCUMENTS

CN 110943933 A * 3/2020 ........ H04W 28/0866
JP 2008502192 A 1/2008
(Continued)

OTHER PUBLICATIONS

English translation for CN_110943933_A_Qu (Year: 2020).*

*Primary Examiner* — Sujoy K Kundu
*Assistant Examiner* — Weibin Huang
(74) *Attorney, Agent, or Firm* — Price Heneveld LLP

(57) ABSTRACT

A data transmission method and apparatus, and storage medium are provided. The method includes: determining, by a layer 3 (L3), data to be transmitted via a medium access control (MAC) link, wherein a quantity of the data to be transmitted is determined such that a data buffer of an MAC function entity meets a transmission rate of the MAC link.

19 Claims, 4 Drawing Sheets

(56) References Cited

U.S. PATENT DOCUMENTS

| | | | | |
|---|---|---|---|---|
| 2014/0341173 | A1 | 11/2014 | Wu | |
| 2015/0327115 | A1 | 11/2015 | Park et al. | |
| 2015/0382336 | A1* | 12/2015 | Zhang | H04W 16/32 370/329 |
| 2018/0234212 | A1* | 8/2018 | Park | H04B 7/022 |
| 2018/0324637 | A1* | 11/2018 | Deng | H04L 1/1854 |
| 2021/0111841 | A1* | 4/2021 | Ohta | H04W 76/27 |
| 2021/0160858 | A1* | 5/2021 | Wu | H04W 28/0278 |
| 2022/0116149 | A1* | 4/2022 | Yang | H04L 1/1812 |

FOREIGN PATENT DOCUMENTS

| | | | |
|---|---|---|---|
| JP | 2016174382 | A | 9/2016 |
| WO | 2013138043 | A1 | 9/2013 |
| WO | 2020029826 | A1 | 2/2020 |

* cited by examiner

SN SWITCHING METHOD FOR DATA TRANSMISSION AND APPARATUS, AND STORAGE MEDIUM

CROSS-REFERENCE TO RELATED APPLICATION

This application is the U.S. national phase of PCT Application No. PCT/CN2021/122714 filed on Oct. 8, 2021, which claims priority to Chinese Patent Application No. 202011073084.3 filed on Oct. 9, 2020, the disclosures of which are incorporated in their entirety by reference herein.

TECHNICAL FIELD

The present disclosure relates to the field of wireless communications technologies, in particular to a data transmission method and apparatus, and storage medium.

BACKGROUND

The design goal of a lite network for the next generation mobile communications currently only introduces a control plane (CP) function in layer 3 (L3), that is, the L3 only has a radio resource control (RRC) protocol layer (or sublayer). The RRC protocol layer accomplishes a radio resource control function.

The related art lacks a solution capable of supporting data transmission between L3 and a media access control (MAC) layer.

SUMMARY

To solve the problem in the related art, embodiments of the present disclosure provide a data transmission method and apparatus, and storage medium.

Embodiments of the present disclosure provide following technical solutions.

A data transmission method is performed by a layer 3 (L3) and includes:

determining data to be transmitted via a medium access control (MAC) link, wherein a quantity of the data to be transmitted is determined such that a data buffer of an MAC function entity meets a transmission rate of the MAC link.

In the solution, the method further includes: transmitting corresponding data via the MAC link after the quantity of the data to be transmitted is determined according to data transmitting and receiving information on the MAC link.

In the solution, the transmitting corresponding data via the MAC link after the quantity of the data to be transmitted is determined according to data transmitting and receiving information on the MAC link includes:

receiving data transmitting status information transmitted by each MAC link; and adjusting, according to the data transmitting status information transmitted by each MAC link, data to be transmitted via each MAC link.

In the solution, the data transmitting status information is transmitted by the MAC in one of or a combination of following manners:

the data transmitting status information is transmitted according to a status of the data buffer;

the data transmitting status information is transmitted by the MAC periodically;

the data transmitting status information is transmitted in response to a data transmitting request sent to the MAC.

In the solution, the determining data to be transmitted via the MAC link is performed according to the data transmitting status information transmitted by the MAC, and/or is performed according to data received by the L3 from an upper layer.

In the solution, the method further includes: after the data transmitted by the upper layer is received, transmitting the received data directly to the MAC, or firstly buffering the received data and then transmitting to the MAC.

In the solution, the method further includes: after the data transmitted by the MAC is received, transmitting the received data sequentially to an upper layer.

In the solution, the method further includes: performing transmission of measurement quantities and data packets separately by using logical channels different from or same as logical channels used by the MAC.

In the solution, the method further includes: in case that there are multiple MAC links, selecting an MAC link and/or switching a sequence number (SN) of data to be transmitted via the MAC link when transmitting data.

In the solution, an MAC link for transmitting data is selected after the MAC links are sorted according to measurement quantities reported on each MAC link; and/or, whether to activate SN switching is determined according to data transmitting information of each MAC link.

In the solution, when transmitting data, a total quantity of data to be transmitted via each MAC link is determined according to buffer occupancy (BO) condition and a data transmission rate reported by each MAC, and a quantity of data received by the L3 from an upper layer.

In the solution, when switching the SN of data to be transmitted via the MAC link, a preceding MAC link and a succeeding MAC link corresponding to data of the MAC link are determined according to a received MAC link selection control packet, and the sorting is performed according to the MAC link selection control packet.

In the solution, when switching the SN of data to be transmitted via the MAC link, the method further includes:

transmitting a link selection control protocol data unit (PDU) and data packets to the MAC link when transmitting data, wherein the link selection control PDU is inserted at the beginning of a data cluster, and encompasses a preceding data cluster and a succeeding data cluster corresponding to the data cluster.

In the solution, when receiving data in a hybrid automatic repeat request (HARQ) process, each data packet received in the HARQ process carries a preceding HARQ process identifier (ID) corresponding to the data packet.

In the solution, when transmitting data, an SN length corresponding to a transmitting window and a receiving window is determined according to a data transmission rate and a service quality of service (QoS) property.

In the solution, the method is performed by an L3 user plane function (UP).

A data transmission method is performed by an MAC and includes:

performing data transmission with an L3 via an MAC link, wherein a quantity of data to be transmitted is determined by the L3, and a quantity of the data to be transmitted is determined such that a data buffer of an MAC function entity meets a transmission rate of the MAC link.

In the solution, the MAC link is an uplink and/or downlink connection link between the L3 and the MAC function entity.

In the solution, the MAC transmits data transmitting status information to the L3.

In the solution, the data transmitting status information is transmitted by the MAC in one of or a combination of following manners:

the data transmitting status information is transmitted according to a status of the data buffer;

the data transmitting status information is transmitted by the MAC periodically;

the data transmitting status information is transmitted in response to a data transmitting request sent by the L3 to the MAC.

In the solution, when performing the data transmission via the MAC link, the data is transmitted by the MAC according to the data transmitting status information transmitted by the MAC; and/or, the data is transmitted according to data received by the L3 from an upper layer.

In the solution, the method further includes: performing transmission of measurement quantities and data packets separately by using different logical channels or the same logical channels.

In the solution, the method further includes:

reporting measurement quantities, so that the L3 sorts MAC links according to the measurement quantities reported on each MAC link and selects an MAC link for transmitting data; and/or, transmitting data transmitting information, so that the L3 determines whether to activate SN switching according to the data transmitting information of each MAC link.

In the solution, the method further includes: reporting BO condition and a data transmission rate, so that the L3, when transmitting data, determines a total quantity of data to be transmitted via each MAC link according to the BO condition and the data transmission rate reported by each MAC, and a quantity of data received by the L3 from an upper layer.

In the solution, when the L3 switching an SN of data to be transmitted via the MAC link, the MAC informs, by transmitting an MAC link selection control packet, the L3 of a preceding MAC link and a succeeding MAC link corresponding to data of the MAC link, and to perform sorting according to the MAC link selection control packet.

In the solution, when switching an SN of data to be transmitted via the MAC link, the method further includes:

receiving a link selection control PDU and data packets transmitted by the L3, wherein the link selection control PDU is inserted at the beginning of a data cluster, and encompasses a preceding data cluster and a succeeding data cluster corresponding to the data cluster.

In the solution, when transmitting data in an HARQ process to the L3, each data packet received in the HARQ process carries a preceding HARQ process ID corresponding to the data packet.

In the solution, when transmitting data, an SN length corresponding to a transmitting window and a receiving window is determined according to a data transmission rate and a service QoS property.

A data transmission apparatus is located in an L3, and includes:

a processor, configured to read a program in a memory to implement following step: determining data to be transmitted via an MAC link, wherein a quantity of the data to be transmitted is determined such that a data buffer of an MAC function entity meets a transmission rate of the MAC link;

a transceiver, configured to receive and transmit data under the control of the processor.

In the solution, the processor is further configured to implement: transmitting corresponding data via the MAC link after the quantity of the data to be transmitted is determined according to data transmitting and receiving information on the MAC link.

In the solution, the transmitting corresponding data via the MAC link after the quantity of the data to be transmitted is determined according to data transmitting and receiving information on the MAC link includes:

receiving data transmitting status information transmitted by each MAC link; and adjusting, according to the data transmitting status information transmitted by each MAC link, data to be transmitted via each MAC link.

In the solution, the data transmitting status information is transmitted by the MAC in one of or a combination of following manners:

the data transmitting status information is transmitted according to a status of the data buffer;

the data transmitting status information is transmitted by the MAC periodically;

the data transmitting status information is transmitted in response to a data transmitting request sent to the MAC.

In the solution, the determining data to be transmitted via the MAC link is performed according to the data transmitting status information transmitted by the MAC, and/or is performed according to data received by the L3 from an upper layer.

In the solution, the processor is further configured to implement: after the data transmitted by the upper layer is received, transmitting the received data directly to the MAC, or firstly buffering the received data and then transmitting to the MAC.

In the solution, the processor is further configured to implement: after the data transmitted by the MAC is received and sorted successfully, transmitting the received data sequentially to an upper layer.

In the solution, the processor is further configured to implement: performing transmission of measurement quantities and data packets separately by using logical channels different from or same as logical channels used by the MAC.

In the solution, the processor is further configured to implement: in case that there are multiple MAC links, selecting an MAC link and/or switching a sequence number (SN) of data to be transmitted via the MAC link when transmitting data.

In the solution, an MAC link for transmitting data is selected after the MAC links are sorted according to measurement quantities reported on each MAC link; and/or, whether to activate SN switching is determined according to data transmitting information of each MAC link.

In the solution, when transmitting data, a total quantity of data to be transmitted via each MAC link is determined according to buffer occupancy (BO) condition and a data transmission rate reported by each MAC, and a quantity of data received by the L3 from an upper layer.

In the solution, when switching the SN of data to be transmitted via the MAC link, a preceding MAC link and a succeeding MAC link corresponding to data of the MAC link are determined according to a received MAC link selection control packet, and the sorting is performed according to the MAC link selection control packet.

In the solution, when switching the SN of data to be transmitted via the MAC link, further includes:

transmitting a link selection control protocol data unit (PDU) and data packets to the MAC link when transmitting data, wherein the link selection control PDU is inserted at the beginning of a data cluster, and encompasses a preceding data cluster and a succeeding data cluster corresponding to the data cluster.

In the solution, when receiving data in a hybrid automatic repeat request (HARQ) process, each data packet received in the HARQ process carries a preceding HARQ process identifier (ID) corresponding to the data packet.

In the solution, when transmitting data, an SN length corresponding to a transmitting window and a receiving window is determined according to a data transmission rate and a service quality of service (QoS) property.

In the solution, the data transmission is performed by an L3 user plane function (UP).

A data transmission apparatus is located in an L3 and includes:

a control module, configured to determine data to be transmitted via an MAC link, wherein a quantity of the data to be transmitted is determined such that a data buffer of an MAC function entity meets a transmission rate of the MAC link.

In the solution, the control module is further configured to transmit corresponding data via the MAC link after the quantity of the data to be transmitted is determined according to data transmitting and receiving information on the MAC link.

In the solution, when the control module is configured to transmit corresponding data via the MAC link after the quantity of the data to be transmitted is determined according to data transmitting and receiving information on the MAC link, the control module is configured to:

receive data transmitting status information transmitted by each MAC link; and adjust, according to the data transmitting status information transmitted by each MAC link, data to be transmitted via each MAC link.

In the solution, the control module is further configured to receive the data transmitting status information transmitted by the MAC in one of or a combination of following manners:

the data transmitting status information is transmitted according to a status of the data buffer;

the data transmitting status information is transmitted by the MAC periodically;

the data transmitting status information is transmitted in response to a data transmitting request sent by the L3 to the MAC.

In the solution, the control module is further configured to, when transmitting data via the MAC link, transmit according to the data transmitting status information transmitted by the MAC, and/or transmit according to data received by the L3 from an upper layer.

In the solution, the control module is further configured to transmit, after the data transmitted by the upper layer is received, the received data directly to the MAC, or firstly buffering the received data.

In the solution, the control module is further configured to transmit, after the data transmitted by the MAC is received and sorted successfully, the received data sequentially to an upper layer.

In the solution, the control module is further configured to perform transmission of measurement quantities and data packets separately by using logical channels different from or same as logical channels used by the MAC.

In the solution, the control module is further configured to, in case that there are multiple MAC links, select an MAC link and/or switch a sequence number (SN) of data to be transmitted via the MAC link when transmitting data.

In the solution, the control module is further configured to: select an MAC link configured for transmitting data after the MAC links are sorted according to measurement quantities reported on each MAC link; and/or, determine whether to activate SN switching according to data transmitting information of each MAC link.

In the solution, the control module is further configured to, when transmitting data, determine a total quantity of data to be transmitted via each MAC link according to buffer occupancy (BO) condition and a data transmission rate reported by each MAC, and a quantity of data received from an upper layer.

In the solution, the control module is further configured to, when switching the SN of data to be transmitted via the MAC link, determine a preceding MAC link and a succeeding MAC link corresponding to data of the MAC link according to a received MAC link selection control packet, and perform the sorting according to the MAC link selection control packet.

In the solution, the control module is further configured to, when switching the SN of data to be transmitted via the MAC link, transmit a link selection control protocol data unit (PDU) and data packets to the MAC link when transmitting data, wherein the link selection control PDU is inserted at the beginning of a data cluster, and encompasses a preceding data cluster and a succeeding data cluster corresponding to the data cluster.

In the solution, the control module is further configured to receive data in a hybrid automatic repeat request (HARQ) process, wherein each data packet received in the HARQ process carries a preceding HARQ process identifier (ID) corresponding to the data packet.

In the solution, the control module is further configured to, when transmitting data, determine an SN length corresponding to a transmitting window and a receiving window according to a data transmission rate and a service quality of service (QoS) property.

In the solution, the data transmission is performed by an L3 UP.

A data transmission apparatus is located in an MAC and includes:

a processor, configured to read a program in a memory to implement following step: performing data transmission with an L3 via an MAC link, wherein a quantity of data to be transmitted is determined by the L3, and a quantity of the data to be transmitted is determined such that a data buffer of an MAC function entity meets a transmission rate of the MAC link;

a transceiver, configured to receive and transmit data under the control of the processor.

In the solution, the MAC link is an uplink and/or downlink connection link between the L3 and the MAC function entity.

In the solution, the MAC transmits data transmitting status information to the L3.

In the solution, the data transmitting status information is transmitted in one of or a combination of following manners:

the data transmitting status information is transmitted according to a status of the data buffer;

the data transmitting status information is transmitted by the MAC periodically;

the data transmitting status information is transmitted in response to a data transmitting request sent by the L3 to the MAC.

In the solution, when performing the data transmission via the MAC link, the data is transmitted by the L3 according to the data transmitting status information transmitted by the MAC; and/or, the data is transmitted according to data received by the L3 from an upper layer.

In the solution, the processor is further configured to implement: performing transmission of measurement quantities and data packets separately by using logical channels different from or same as logical channels used by the L3.

In the solution, the processor is further configured to implement:

reporting measurement quantities, so that the L3 sorts MAC links according to the measurement quantities reported on each MAC link and selects an MAC link for transmitting data; and/or, transmitting data transmitting information, so that the L3 determines whether to activate SN switching according to the data transmitting information of each MAC link.

In the solution, the processor is further configured to implement: reporting BO condition and a data transmission rate, so that the L3, when transmitting data, determines a total quantity of data to be transmitted via each MAC link according to the BO condition and the data transmission rate reported by each MAC, and a quantity of data received by the L3 from an upper layer.

In the solution, when the L3 switching an SN of data to be transmitted via the MAC link, the MAC informs, by transmitting an MAC link selection control packet, the L3 of a preceding MAC link and a succeeding MAC link corresponding to data of the MAC link, and to perform sorting according to the MAC link selection control packet.

In the solution, when switching an SN of data to be transmitted via the MAC link, the processor is further configured to implement:

receiving a link selection control PDU and data packets transmitted by the L3, wherein the link selection control PDU is inserted at the beginning of a data cluster, and encompasses a preceding data cluster and a succeeding data cluster corresponding to the data cluster.

In the solution, when transmitting data in an HARQ process to the L3, each data packet received in the HARQ process carries a preceding HARQ process ID corresponding to the data packet.

In the solution, when transmitting data, an SN length corresponding to a transmitting window and a receiving window is determined according to a data transmission rate and a service QoS property.

A data transmission apparatus is located in an MAC, and includes:

a transmission module, configured to perform data transmission with an L3 via an MAC link, wherein a quantity of data to be transmitted is determined by the L3, and a quantity of the data to be transmitted is determined such that a data buffer of an MAC function entity meets a transmission rate of the MAC link.

In the solution, the MAC link is an uplink and/or downlink connection link between the L3 and the MAC function entity.

In the solution, the transmission module is further configured to transmit data transmitting status information to the L3.

In the solution, the transmission module is further configured to transmit the data transmitting status information in one of or a combination of following manners:

transmit the data transmitting status information according to a status of the data buffer;

transmit the data transmitting status information periodically;

transmit the data transmitting status information in response to a data transmitting request sent by the L3 to the MAC.

In the solution, the transmission module is further configured to perform the data transmission via the MAC link, wherein the data is transmitted by the L3 according to the data transmitting status information transmitted by the MAC; and/or, the data is transmitted according to data received by the L3 from an upper layer.

In the solution, the transmission module is further configured to perform transmission of measurement quantities and data packets separately by using logical channels different from or same as logical channels used by the L3.

In the solution, the transmission module is further configured to:

report measurement quantities, so that the L3 sorts MAC links according to the measurement quantities reported on each MAC link and selects an MAC link for transmitting data; and/or, transmit data transmitting information, so that the L3 determines whether to activate SN switching according to the data transmitting information of each MAC link.

In the solution, the transmission module is further configured to report BO condition and a data transmission rate, so that the L3, when transmitting data, determines a total quantity of data to be transmitted via each MAC link according to the BO condition and the data transmission rate reported by each MAC, and a quantity of data received by the L3 from an upper layer.

In the solution, the transmission module is further configured to, when the L3 switching an SN of data to be transmitted via the MAC link, inform, by transmitting an MAC link selection control packet, the L3 of a preceding MAC link and a succeeding MAC link corresponding to data of the MAC link, and to perform sorting according to the MAC link selection control packet.

In the solution, the transmission module is further configured to, when switching an SN of data to be transmitted via the MAC link, receive a link selection control PDU and data packets transmitted by the L3, wherein the link selection control PDU is inserted at the beginning of a data cluster, and encompasses a preceding data cluster and a succeeding data cluster corresponding to the data cluster.

In the solution, the transmission module is further configured to transmit data in an HARQ process to the L3, wherein each data packet received in the HARQ process carries a preceding HARQ process ID corresponding to the data packet.

In the solution, the transmission module is further configured to, when transmitting data, determine an SN length corresponding to a transmitting window and a receiving window according to a data transmission rate and a service QoS property.

A computer readable storage medium stores a computer program, wherein the computer program is configured to be executed by a processor to implement the aforementioned data transmission method.

The technical solutions provided by the embodiments of the present disclosure provide a data transmission solution for L3 UP, thereby the L3 UP is responsible for allocating for each MAC link a quantity of the data to be transmitted, and the L3 UP has a data flow control function, which is at least capable of solving the problem that there is no technical solution supporting data transmission between L3 and MAC layer.

Additionally, the technical solutions provided by the embodiments of the present disclosure provide an interaction solution between the MAC and the L3 UP and provide a solution for the L3 UP to allocate a quantity of transmission data, such that the MAC can measure the receiving and transmitting of air interface data and transmit the measurement information to the L3 UP, and such that the L3 UP can perform flow controlling based on these measurement information.

Besides, the technical solutions provided by the embodiments of the present disclosure provide a solution for the MAC to sort data. Specifically, the MAC may perform sorting by using SN, or perform sorting based on the random order of HARQ process, or perform sorting based on a combination of SN and the random order of HARQ process; and the MAC is capable of judging whether to activate an SN sorting window.

The aforementioned solutions provide a solution to the problem related to MAC link when the L3 UP selects an MAC link.

More specifically, with the technical solutions provided by the embodiments of the present disclosure, at least one of or a combination of following effects can be achieved:

- a flow controlling between MAC and L3 UP can be implemented;
- L3 UP can select, according to the link quality, different MACs to transmit data;
- L3 UP can select an air interface according to a channel quality, thereby improving data transmitting efficiency.

Since the MAC link control PDU of L3 UP can be used, the flexibility in link selection is increased.

BRIEF DESCRIPTION OF THE DRAWINGS

The accompanying drawings described herein are used to provide further understanding of the present disclosure and constitute a part of the present disclosure. The exemplary embodiments of the present disclosure and their descriptions are used to explain the present disclosure and do not constitute an improper limitation of the present disclosure.

DETAILED DESCRIPTION

The design goal of a lite network for the next generation mobile communications introduces a user plane (UP) function (i.e., data plane function) in layer 3 (L3) for data processing, and the data plane function of L3 is directly connected to an MAC protocol function entity of layer 2 (L2), regardless of whether there is other protocol entity in L2 (L2 in fifth generation mobile communications technology (5G) includes four protocol sublayers, namely, service data adaptation protocol (SDAP), packet data convergence protocol (PDCP), radio link control (RLC) and MAC).

The UP function is introduced in the L3 (in 5G system, the RRC layer of AS is referred to as third layer protocol) of the access stratum (AS). In the third generation mobile communications technology (3G), the fourth generation mobile communications technology (4G) and 5G systems, on the terminal side, only CP exists in the AS layer (terminal side. For the network side, it's the RRC protocol layer), that is, there is only RRC protocol layer; correspondingly, on the network side, only an RRC protocol layer (which may also be called sublayer) exists in the radio access network (RAN). The RRC protocol layer accomplishes a radio resource control function, and does not possess data processing function of UP.

It is considered to introduce L3 UP in the future. The L3 UP should have a data sorting function, to ensure that data packets are delivered to an upper layer sequentially. Meanwhile, in case that one L3 UP is connected to multiple L2 function entities simultaneously, the L3 UP needs to sort data submitted by the multiple L2 entities; and also needs to distribute data packets among the different L2 entities.

Figure 1:
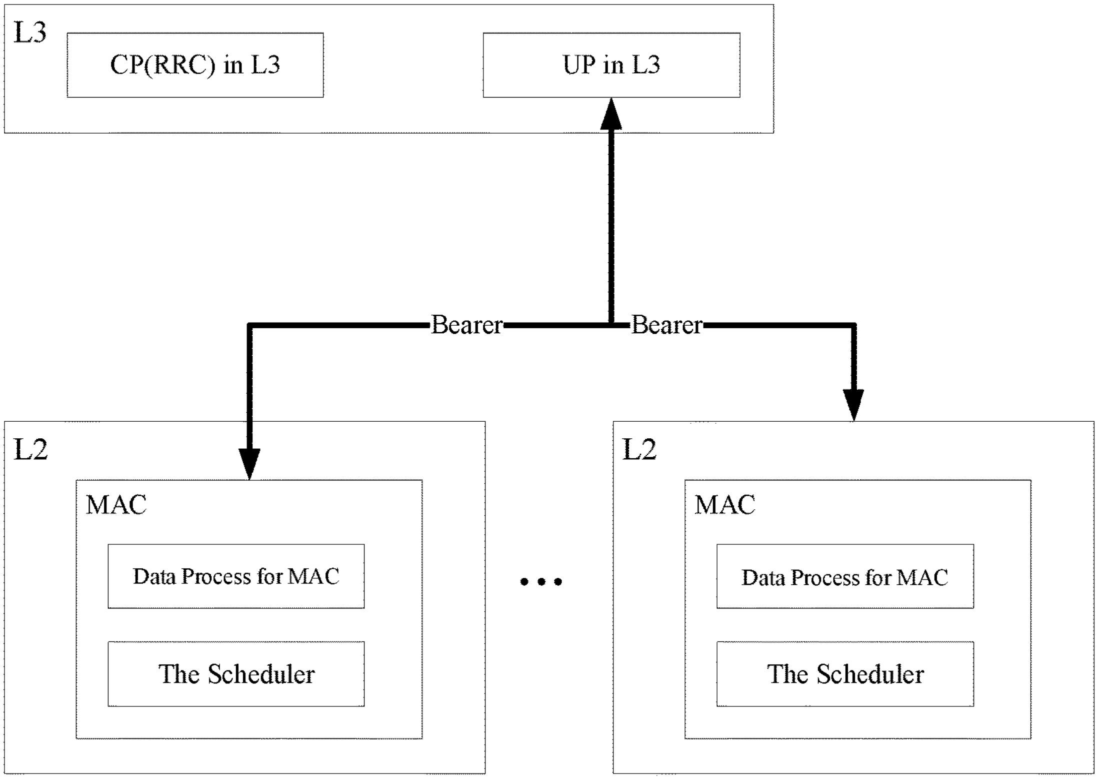
FIG. 1 is a schematic diagram showing connections between one L3 UP and multiple L2 function entities according to an embodiment of the present disclosure.

FIG. 1 is a schematic diagram showing connections between one L3 UP and multiple L2 function entities. As shown in FIG. 1, the L3 UP is directly connected to the MAC sub-protocol function entities of $L2^{th}$ rough a bearer (e.g., IP flow). The bearer between the L3 UP and the MAC sub-protocol entities may be IP flows, or other kind of bearer, i.e., a logical bearer carrying IP packets. Each IP flow conveys IP packets or IP packets processed by the L3 UP.

L3 UP needs to perform flow controlling according to the MAC transmission rate. In case that multiple MAC links are connected to the L3 UP, the flow controlling function of the L3 UP not only needs to select different MAC links for transmitting data, but also needs to ensure that data can be transmitted and received in proper order.

Figure 2:
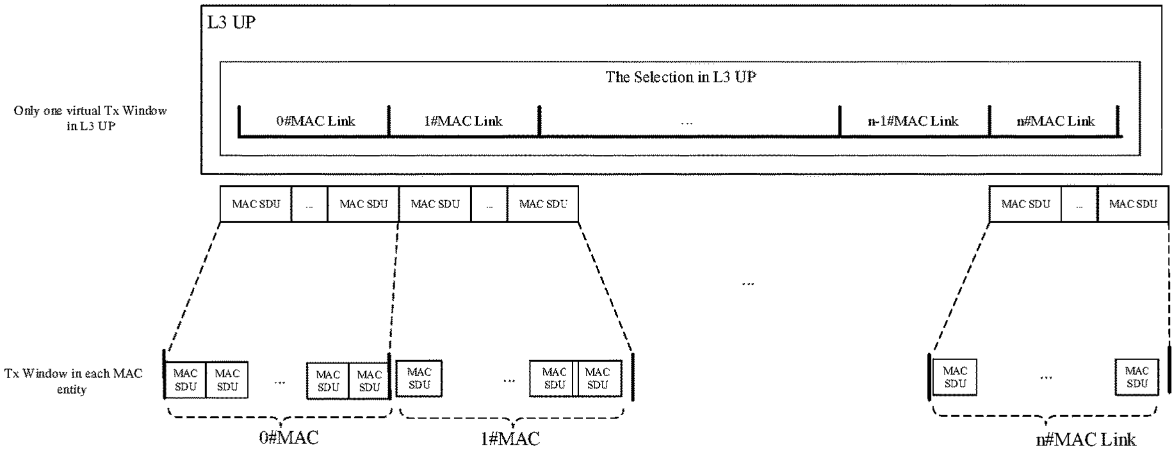
FIG. 2 is a schematic diagram of a sorting window selection function of L3 UP according to an embodiment of the present disclosure.

FIG. 2 is a schematic diagram of a sorting window selection function of L3 UP. A virtual window and MAC link selection function is introduced in L3 UP, as shown in FIG. 2.

Selection of an MAC link: the MAC link may be selected in the order of the MAC link indexes, or an MAC link with the highest air interface throughput may be preferentially selected based on the rate at which each MAC link transmits data packets, or an MAC link with an air interface transmission rate matching the quality of service (QoS) requirement of data may be selected based on the QoS requirement of data, or an MAC link may be selected in consideration of multiple factors. For example, if the link is selected sequentially, then the link is selected cyclically among links with indexes 0, 1 and 2; if the link is selected in consideration of multiple factors, factors such as the transmission rate of each link, the block error rate (BLER) of data packet transmission, the service QoS requirements, the load of the cell where the MAC link is located, a total quantity of users to be scheduled by the MAC scheduler or the like may be considered. When one sub-window is selected, if there is still preceding data being transmitted in the MAC layer within the sub-window, the L3 UP needs to inform the MAC layer to reset the transmitting window to an initial value, that is, counting SN from 0, after transmission of preceding data is completed and before transmission of current data packets commences.

However, an existing problem is: there is no corresponding solution to address issues related to MAC links when L3 UP selects an MAC link.

For example, when the L3 UP selects an MAC link, it is necessary to determine a total quantity of data to be transmitted via the MAC link, the SN resetting on the MAC link, the relationship between data being transmitted via the MAC link and new data after the MAC link reselection, or the like. These lead to the issue of setting data buffer size for the MAC link, and the issue of selecting SN on the MAC link.

In consideration of the aforementioned problem, embodiments of the present disclosure provide a solution for supporting L3 UP. The solution achieves the SN switching on the MAC link, and the setting of data buffer size for the MAC link by using MAC connection information indication of L3 UP.

It is noted, the L3 UP referred to in embodiments of the present disclosure is a nomenclature used in the embodiments of the present disclosure, and refers to one function entity in L3$^{th}$ at is mainly responsible for processing data, more specifically, responsible for determining data to be transmitted via the MAC link, wherein a quantity of the data to be transmitted is determined such that a data buffer of an MAC function entity meets a transmission rate of the MAC link. In order to highlight the UP-like property of the function entity, the function entity is named L3 UP. However, what the function entity will be named in the future is indeterminate, and whatever it is named, it can be easily identified as a same function entity as the L3 UP in the embodiments of the present disclosure based on the description of the embodiments of the present disclosure.

Specific implementations of the present disclosure are described with reference to accompanying drawings hereinafter.

The description covers the implementations on the L3 UP side and the MAC side respectively, and then provides examples in which the L3 UP and the MAC work in coordination, so as to facilitate a better understanding of the implementations of the solutions according to embodiments of the present disclosure. Such a manner of description does not mean L3 UP and MAC must be implemented in coordination, or must be implemented separately. In fact, when the L3 UP and the MAC are implemented separately, they each solve the problem on their own side, and when they are used in coordination, a better technical effect can be obtained.

Firstly, some of involved features are described briefly.

L1/L2/L3: layer 1, layer 2, layer 3.

UP: a general designation of functions for processing data.

CP: a general designation of functions for processing signaling and controlling.

The RRC in layer 3 is a control function.

The newly introduced UP of layer 3 is a data processing function of layer 3.

L1 is the physical layer.

Figure 3:
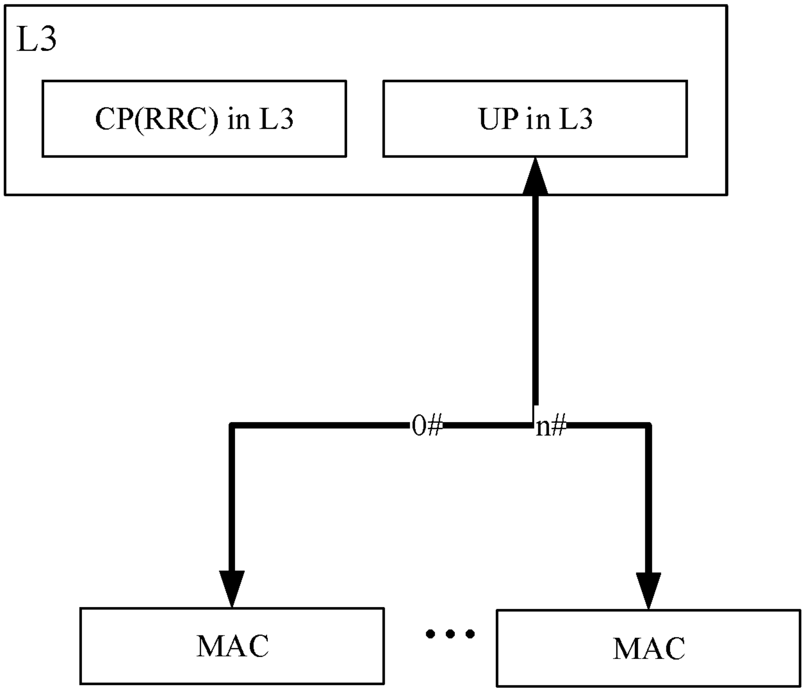
FIG. 3 is a schematic diagram of MAC links according to an embodiment of the present disclosure.

The MAC link refers to uplink (receiving) and downlink (transmitting) connection links between L3 UP and MAC function entities. FIG. 3 is a schematic diagram of MAC links. As shown in FIG. 3, connections labeled as 0 # to n # are the MAC links.

An L3 UP and MAC two-stage SN mechanism is defined. By binding SNs with links, short SNs of air interface data packets are realized; with transmitting SN (MAC link) selection control PDU of end-to-end L3 UP, a skipped allocation of SN segments can be achieved without jeopardizing the continuity of SNs.

Figure 4:
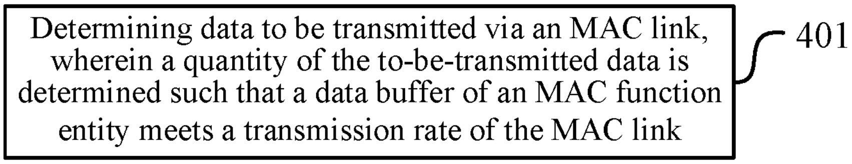
FIG. 4 is a flow diagram of a data transmission method on an L3 UP side according to an embodiment of the present disclosure.

FIG. 4 is a flow diagram of a data transmission method on an L3 UP side. As shown in FIG. 4, the data transmission method on the L3 UP side includes:

step 401, determining data to be transmitted via an MAC link, wherein a quantity of the data to be transmitted is determined such that a data buffer of an MAC function entity meets a transmission rate of the MAC link.

In an embodiment, the data transmission is performed by L3 UP.

Figure 5:
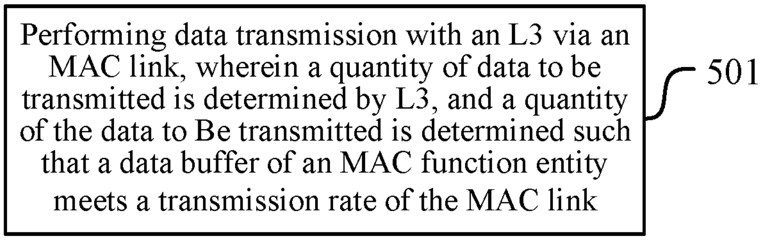
FIG. 5 is a flow diagram of a data transmission method on an MAC side according to an embodiment of the present disclosure.

FIG. 5 is a flow diagram of a data transmission method on an MAC side. As shown in FIG. 5, the data transmission method on the MAC side includes:

step 501, performing data transmission with an L3 via an MAC link, wherein a quantity of data to be transmitted is determined by the L3, and a quantity of the data to be transmitted is determined such that a data buffer of an MAC function entity meets a transmission rate of the MAC link.

In an embodiment, the MAC link is an uplink and/or downlink connection link between the L3 and the MAC function entity.

The solution provided by the embodiments of the present disclosure is a flow controlling solution for the L3 UP. The flow controlling of L3 UP mainly accomplishes following two functions:

1. Transmitting data to each MAC link, to ensure that a data buffer of an MAC function entity meets a rate at which the MAC transmits;
2. Enabling MAC to perform correct SN initial value selection and MAC data packet transmitting switching during SN switching (i.e., an MAC link selection under the control of L3 UP).

If there is only one MAC link, L3 UP may not perform flow controlling, that is, once the L3 UP on the transmitting end receives data from an upper layer, the L3 UP can transmit the data directly to MAC; meanwhile, the L3 UP does not perform MAC link selection, i.e., SN switching is not performed. If the data buffer of the MAC is limited in size, the MAC needs to send to the L3 UP a piece of application information to request the L3 UP to activate flow controlling.

In an embodiment, the method may further include:

transmitting corresponding data to the MAC link after the quantity of the data to be transmitted is determined according to data transmitting and receiving information on the MAC link.

If there are multiple MAC links, the L3 UP selects an MAC link and/or switches an SN of data to be transmitted via the MAC link when transmitting data.

Specifically, when there are multiple MAC links, the L3 UP may activate flow controlling and MAC link selection function.

If there is only one MAC link, the L3 UP may transmit the data directly to the MAC link, without obtaining the information of the link preceding to transmitting the data.

In an embodiment, the transmitting corresponding data to the MAC link after the quantity of the data to be transmitted is determined according to data transmitting and receiving information on the MAC link includes:

receiving data transmitting status information transmitted by each MAC link; and adjusting, according to the data transmitting status information transmitted by each MAC link, data to be transmitted via each MAC link.

Correspondingly, on the MAC side, the MAC transmits data transmitting status information to the L3.

Specifically, each MAC link transmits, to L3 UP, data transmitting status information, i.e., BO condition, a quantity of data to be transmitted by L3 UP, a rate at which the MAC transmits data, a maximum delay and an average delay of MAC PDU transmission, a segmentation ratio of data packets (a ratio of a quantity of segmented data packets relative to a total quantity of MAC service data units (SDUs) in a period of time), a general position of an average MAC PDU byte length among lengths of all transmittable MAC PDUs (e.g., assuming that the MAC PDU sizes can be categorized into 0 to 1000 classes in an ascending order, a position of average MAC PDU size of MAC PDUs transmitted via the MAC link among the 0 to 1000 classes), and the like.

The MAC transmits to the L3 UP the data transmitting and receiving information on the MAC link, to provide the L3 UP with measurement information for performing flow controlling. In case that there is only one MAC link connected to the L3 UP, the L3 UP may not need data information on the MAC link, and may directly transmit data received from an upper layer thereof to the MAC. In case that there are multiple MAC links connected to the L3 UP, the L3 UP may distribute suitable data to each MAC link according to the data transmitting and receiving information on each MAC link.

In an embodiment, the data transmitting status information is transmitted by the MAC in one of or a combination of following manners:

the data transmitting status information is transmitted according to a status of the data buffer;

the data transmitting status information is transmitted by the MAC periodically;

the data transmitting status information is transmitted in response to a data transmitting request sent by the L3 UP to the MAC.

Correspondingly, on the MAC side, the data transmitting status information is transmitted by the MAC in one of or a combination of following manners:

the data transmitting status information is transmitted according to a status of the data buffer;

the data transmitting status information is transmitted by the MAC periodically;

the data transmitting status information is transmitted in response to a data transmitting request sent by the L3 to the MAC.

Specifically, the manner in which the data transmitting status information is transmitted may be:

first, the MAC triggers the transmission autonomously; that is, the MAC triggers the transmission according to the status of its data buffer; specifically, the MAC triggers the BO reporting and the application for data quantity if its data buffer is less than a threshold;

second, the MAC reports periodically; here, the BO, data quantity application submitted to the L3 UP, and various statistics can be counted according to the period;

third, a combination of periodical reporting and autonomous triggering by MAC; that is, if the data in the transmitting data buffer of the MAC cannot meet the transmitting requirement, the MAC autonomously triggers the BO reporting and data application; the statistics are reported periodically and carry the BO and data application;

fourth, the L3 UP transmits to the MAC a data transmitting request carrying a quantity of data that can be transmitted; after receiving the request, the MAC responds with a quantity of data that need to be transmitted.

In an embodiment, when the MAC performs the data transmission via the MAC link, the data is transmitted by the L3 UP according to the data transmitting status information transmitted by the MAC; and/or, the data is transmitted according to data received by the L3 from an upper layer.

In a specific implementation, the method may further include:

after the data transmitted by the upper layer is received, transmitting the received data directly to the MAC, or firstly buffering the received data and then transmitting to the MAC.

Specifically, when the L3 UP transmits data, in addition to the transmitting data in response to the data request sent by the MAC, the L3 UP may voluntarily push data to the MAC; the L3 UP timely pushes data to the MAC based on the data received from an upper layer thereof, refrains from buffering the data received from an upper layer thereof, and transmits the data to the MAC as directly as possible; the buffering referred to in the implementation is different from the backup required for ensuring reliable transmission; in the backup buffering required for ensuring reliable transmission, the L3 UP needs to buffer and back up each data packet for services requiring a lossless or seamless switching, until an acknowledgement (ACK) message is received from a lower layer.

The manner in which MAC transmits application data and the manner in which L3 UP transmits voluntarily are used simultaneously, to ensure that the MAC layer has sufficient data to transmit, meanwhile, to reduce the total quantity of messages by which the MAC transmits the application data.

In an embodiment, the method may further include:

after the data transmitted by the MAC is received and sorted successfully, transmitting the received data sequentially to an upper layer.

Specifically, for uplink data transmitted by the MAC to the L3 UP, a principle of "data is sent as many as available" is followed, that is, all the MAC SDUs parsed by the MAC are transmitted directly to the L3 UP, and if the L3 UP can sort the MAC SDUs successfully, then the L3 UP delivers the MAC SDUs sequentially to an upper layer, otherwise, the L3 UP buffers the MAC SDUs and waits to deliver the MAC SDU to the upper layer until they can be delivered sequentially.

In an embodiment, the method may further include: the MAC performs transmission of measurement quantities and data packets separately by using logical channels different from or same as logical channels used by the L3 UP.

Specifically, in order to ensure the timeliness of the interaction between the L3 UP and the MAC, especially to avoid the interplay between the measurement quantities and data packets of the MAC, dedicated logical channels may be set for data transmitting and measurement reporting.

In an embodiment, the method may further include: in case that there are multiple MAC links, the L3 UP selects an MAC link and/or switches an SN of data to be transmitted via the MAC link when transmitting data.

Specifically, after the L3 UP receives the data transmitting status information transmitted by MAC, the L3 UP produces a selection of MAC link according to its flow controlling function. The MAC link selection includes two aspects of functions: first, selection of an MAC link used for subsequent data transmission; second, the switch control of SN on the MAC link.

In an embodiment, the L3 UP sorts MAC links according to the measurement quantities reported on each MAC link and selects an MAC link for transmitting data; and/or, the L3 UP determines whether to activate SN switching according to the data transmitting information of each MAC link.

Correspondingly, on the MAC side, the method may further include:

the MAC reports measurement quantities, so that the L3 UP sorts MAC links according to the measurement quantities reported on each MAC link and selects an MAC link for transmitting data; and/or, the MAC transmits data transmitting information, so that the L3 UP determines whether to activate SN switching according to the data transmitting information of each MAC link.

Specifically, the L3 UP sorts MAC links according to the measurement quantities reported on each MAC link and selects one or more MAC links for transmitting data. The L3 UP determines whether to activate SN switching according to the data transmitting information of each MAC link.

Figure 6:
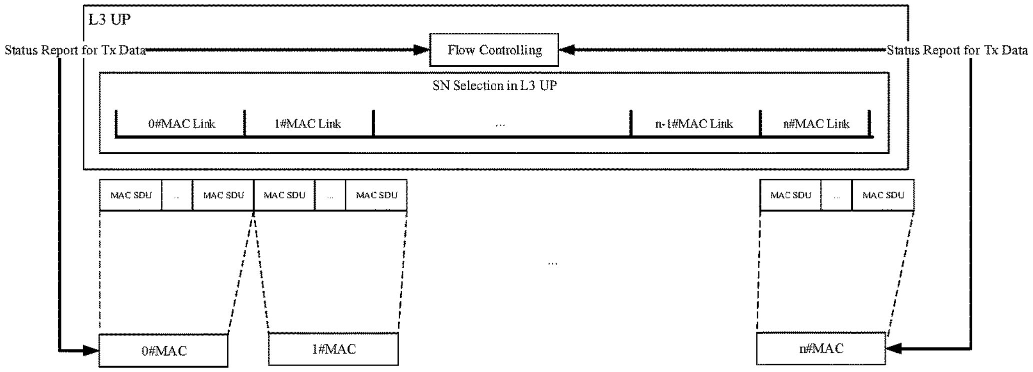
FIG. 6 is a schematic diagram of transmitting data status reporting and flow controlling according to an embodiment of the present disclosure.

FIG. 6 is a schematic diagram of transmitting data status reporting and flow controlling. As shown in FIG. 6, a schematic function diagram showing that the L3 UP performs flow controlling based on the data transmitting status report reported by the MAC is provided. Based on the data transmitting status report, the flow controlling function of the L3 UP selects a suitable MAC link and transmits an appropriate quantity of data packets. The data packet transmitting status report reported by the MAC includes: a maximum rate at which the MAC transmits data within a time interval, BLER, a ratio of data packets that are partitioned for transmission, a ratio of data packets that are concatenated into one MAC PDU for transmission, a ratio of scheduled data packets (a transmission time interval (TTI) quantity for data scheduled to transmit/a time interval for status packet reporting), and the like.

In an embodiment, the L3 UP, when transmitting data, determines a total quantity of data to be transmitted via each MAC link according to the BO condition and the data transmission rate reported by each MAC, and a quantity of data received by the L3 UP from an upper layer.

Correspondingly, on the MAC side, the method may further include:

the MAC reports the BO condition and the data transmission rate, so that the L3 UP, when transmitting data, determines a total quantity of data to be transmitted via each MAC link according to the BO condition and the data transmission rate reported by each MAC, and a quantity of data received by the L3 UP from an upper layer.

Specifically, the data transmitting performed by the L3 UP may be as follows:

The L3 UP determines a total quantity of data to be transmitted via each MAC link according to the BO condition and the data transmission rate reported by each MAC, and a quantity of data received by the L3 UP from an upper layer thereof.

In case that the transmitting sequence of MAC links is not changed, the L3 UP transmits data packets to all the MAC links in a sequence.

Figure 7:
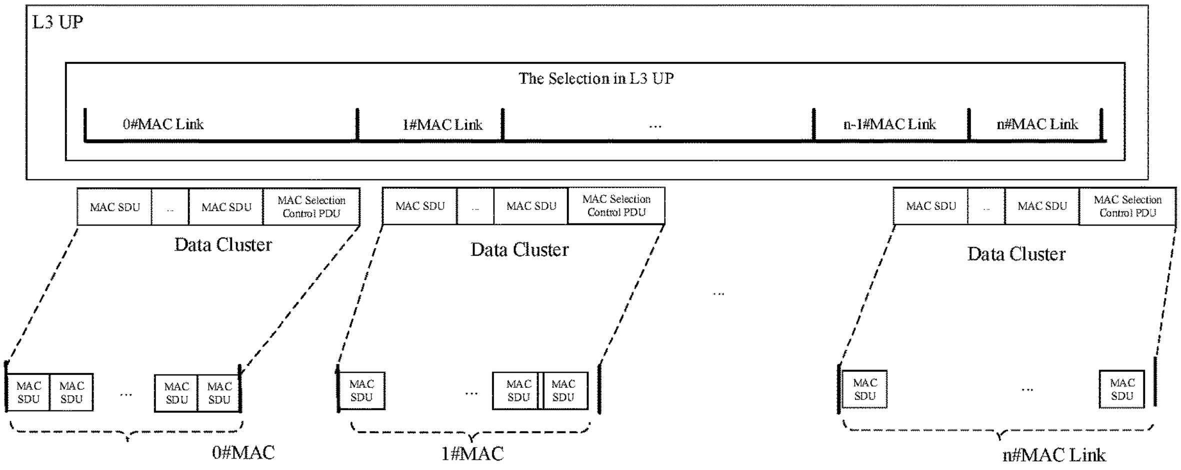
FIG. 7 is a schematic diagram of SN switching according to an embodiment of the present disclosure.

In case that the transmitting sequence of MAC links needs to be changed, the L3 UP needs to activate an SN switching process for the corresponding MAC link. FIG. 7 is a schematic diagram of SN switching, the detail of SN switching is shown in FIG. 7.

In an embodiment, when switching the SN of data to be transmitted via the MAC link, the L3 UP determines a preceding MAC link and a succeeding MAC link corresponding to data of the MAC link according to a received MAC link selection control packet, and performs sorting according to the MAC link selection control packet.

Correspondingly, on the MAC side, when the L3 UP switching an SN of data to be transmitted via the MAC link, the MAC informs, by transmitting an MAC link selection control packet, the L3 UP of a preceding MAC link and a succeeding MAC link corresponding to data of the MAC link, and to perform sorting according to the MAC link selection control packet.

Specifically, the L3 UP needs to retain the sequence of MAC links selected by itself, and perform data flow controlling following the sequence strictly when transmitting data; when the sequence is changed, the MAC needs to transmit an MAC link selection control packet (a kind of control PDU of L3 UP) to inform, the L3 UP on the receiving end, of a preceding MAC link and a succeeding MAC link corresponding to data of the MAC link, so as to ensure the L3 UP on the receiving end can perform sorting correctly.

In an embodiment, when switching the SN of data to be transmitted via the MAC link, the method may further include:

the L3 UP transmits a link selection control PDU and data packets to the MAC link when transmitting data, wherein the link selection control PDU is inserted at the beginning of a data cluster, and encompasses a preceding data cluster and a succeeding data cluster corresponding to the data cluster.

Correspondingly, on the MAC side, when switching an SN of data to be transmitted via the MAC link, the method may further include:

receiving a link selection control PDU and data packets transmitted by the L3 UP, wherein the link selection control PDU is inserted at the beginning of a data cluster, and encompasses a preceding data cluster and a succeeding data cluster corresponding to the data cluster.

Specifically, after the L3 UP selects one or more MAC links for transmitting data, SN on each MAC link needs to be switched together (if the MAC link was not used to transmit data, the switching is equivalent to resetting of the SN once). At this time, when transmitting data, the L3 UP needs to transmit the link selection control PDU and data packets to the MAC link at once.

As shown in FIG. 7, when the L3 UP transmits data packets, each time transmission of one data cluster is completed, and upon transmitting the succeeding data cluster, the L3 UP carries one MAC link selection control PDU at an initial position. The control PDU indicates that the previous data cluster on the MAC link has been completely transmitted, and the subsequent data packets need to be sorted together with the data packets of the preceding and succeeding MAC links indicated by the control PDU. It is equivalent to insertion of an L3 UP control PDU at the start of each transmitted L3 UP data cluster, and the control PDU includes a preceding data cluster and a succeeding data cluster corresponding to the data cluster.

Figure 8:
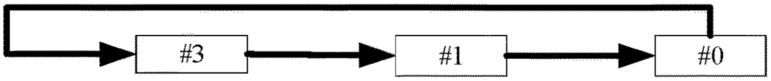
FIG. 8 is a schematic diagram of a preceding relationship and a next relationship according to an embodiment of the present disclosure.

Terms "the preceding" and "the succeeding" refer to an object immediately preceding one object and an object immediately following the one object, respectively. FIG. 8 is a schematic diagram of a preceding relationship and a next relationship. As shown in FIG. 8, the preceding of #1 is #3, the next of #1 is #0; the preceding of #0 is #1, the next of #0 is #3.

Term "data cluster" is a general designation of all data packets that are transmitted by the L3 UP to the MAC and can be sorted sequentially. For example, an L3 UP has data packets with indexes of 0 to 31, and the L3 UP transmits the packets with indexes of 0 to 10 to the 0 #MAC link, wherein the ten data packets may be transmitted all at once, or in batches to the 0 #MAC link. If the sequence of the data packets does not skip any data packet, there is no need to transmit the control PDU of L3 UP. If the L3 UP transmits the data packets with indexes of 21 to 28 to the 0#MAC link after the transmission of data packets with indexes of 0 to 10 is completed, then it is necessary to insert one MAC link selection control PDU of L3 UP before the data packets with indexes of 21 to 28. With the PDU, the MAC on the transmitting end and the MAC on the receiving end may know that the subsequently transmitted or received data packets are not continuous with previous data packets, and data packets are skipped. The L3 UP on the receiving end determines, according to the MAC link selection control PDU, which MAC link's data is to be universally sorted together with the subsequently received data packets.

The SN switching refers to the SN switching of MAC link. After receiving one MAC link selection control PDU of the L3 UP, the MAC needs to reset the SN to indicate that the subsequent data packets are not continuous with previous data packets, and it is necessary to perform sorting again at the MAC layer of the receiving end.

In an embodiment, when the L3 UP receives data in a hybrid automatic repeat request (HARQ) process, each data packet received in the HARQ process carries a preceding HARQ process identifier (ID) corresponding to the data packet.

Correspondingly, on the MAC side, when the MAC transmits data in an HARQ process to the L3 UP, each data packet received in the HARQ process carries a preceding HARQ process ID corresponding to the data packet.

Specifically, when the MAC layer is transmitting, due to the random order of HARQ process, the MAC on the transmitting end needs to ensure that the data in its HARQ process is transmitted in accordance with one data cluster of the L3 UP, and needs to prevent confusion caused by data packets of different data clusters.

One manner is: each data packet transmitted in an HARQ process carries the preceding HARQ process ID corresponding to the data packet. The process ID corresponding to the first data packet is an invalid value. When HARQ transmits the previous data cluster (labeled as DC_1), a new data cluster (labeled as DC_2) arrives. Then with the successful transmission of the data packets in the DC_1, the HARQ processes will be gradually released for transmission of the data packets of DC_2. At this time, the process ID of the preceding data packet corresponding to the data packet of this process is indicated by means of data information in the HARQ process, thereby achieving discontinued transmission of HARQ. That is, when transmitting data packets of DC_1, the 0 to $15^{th}$ process IDs of HARQ are all used, and the $3^{rd}$, $7^{th}$, and $10^{th}$ processes succeeded; then the $3^{rd}$ process carries the first data packet of DC_2, and at this time the preceding process (data packet) of the $3^{rd}$ process is of an invalid value, which indicates that this is the start of a new data cluster. The $10^{th}$ process carries the second data packet of DC_2, at this time the preceding process is 3. In a similar way, the $7^{th}$ process carries the third data packet of DC_2, at this time the preceding process is 10. The rest can be done in the same manner, thereby achieving interrupted data transmission of HARQ.

In an embodiment, when transmitting data, the L3 UP determines an SN length corresponding to a transmitting window and a receiving window according to a data transmission rate and a service QoS property.

Correspondingly, on the MAC side, when transmitting data, the MAC determines an SN length corresponding to a transmitting window and a receiving window according to a data transmission rate and a service QoS property.

Specifically, the MAC may select flexibly the SN length corresponding to the transmitting window and receiving window of the MAC according to a data transmission rate of the MAC and a service QoS property. If the timeliness requirement of the service is high, a short SN may be selected; if the timeliness requirement of the service is low and a quantity of data is large, a long SN may be selected.

Based on the same creative concept, embodiments of the present disclosure further provide a data transmission apparatus and a computer readable storage medium. Since a principle by which these devices solve the problem is similar to that of the data transmission method, for the implementations of these device, references may be made to the implementations of the method. A repeated description is omitted herein.

The technical solution provided by the embodiments of the present disclosure can be implemented in the following manners.

Figure 9:
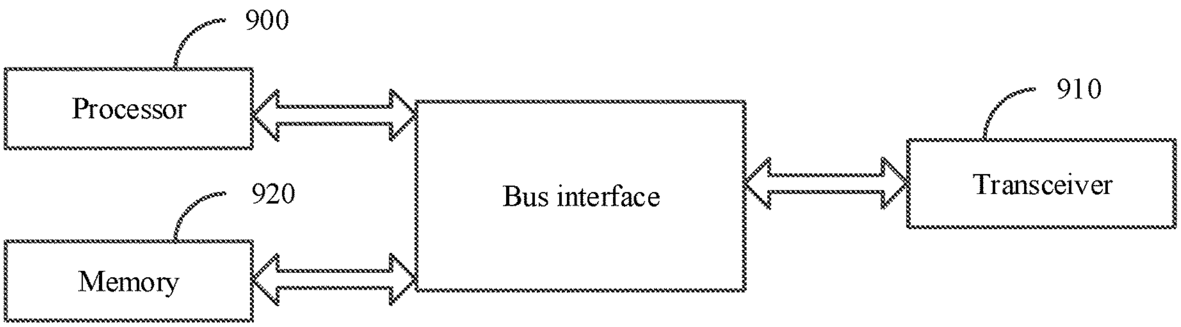
FIG. 9 is a schematic structural diagram of a data transmission apparatus according to an embodiment of the present disclosure.

FIG. 9 is a schematic structural diagram of a data transmission apparatus. The data transmission apparatus is located in L3, and as shown in FIG. 9, includes:

- a processor 900, configured to read a program in a memory 920 to implement following step: determining data to be transmitted via an MAC link, wherein a quantity of the data to be transmitted is determined such that a data buffer of an MAC function entity meets a transmission rate of the MAC link;
- a transceiver 910, configured to receive and transmit data under the control of the processor 900.

In an embodiment, the processor 900 is further configured to implement: transmitting corresponding data via the MAC link after the quantity of the data to be transmitted is determined according to data transmitting and receiving information on the MAC link.

In an embodiment, the transmitting corresponding data via the MAC link after the quantity of the data to be transmitted is determined according to data transmitting and receiving information on the MAC link includes:

- receiving data transmitting status information transmitted by each MAC link; and adjusting, according to the data transmitting status information transmitted by each MAC link, data to be transmitted via each MAC link.

In an embodiment, the data transmitting status information is transmitted by the MAC in one of or a combination of following manners:

the data transmitting status information is transmitted according to a status of the data buffer;

the data transmitting status information is transmitted by the MAC periodically;

the data transmitting status information is transmitted in response to a data transmitting request sent by L3 to the MAC.

In an embodiment, the determining data to be transmitted via the MAC link is performed according to the data transmitting status information transmitted by the MAC, and/or is performed according to data received by the L3 from an upper layer.

In an embodiment, the processor 900 is further configured to implement: after the data transmitted by the upper layer is received, transmitting the received data directly to the MAC, or firstly buffering the received data and then transmitting to the MAC.

In an embodiment, the processor 900 is further configured to implement: transmitting sequentially, to an upper layer, data transmitted by the MAC after the data transmitted by the MAC is received and sorted successfully.

In an embodiment, the processor 900 is further configured to implement: performing transmission of measurement quantities and data packets separately by using logical channels different from or same as logical channels used by the MAC.

In an embodiment, the processor 900 is further configured to implement: in case that there are multiple MAC links, selecting an MAC link and/or switching a sequence number (SN) of data to be transmitted via the MAC link when transmitting data.

In an embodiment, an MAC link for transmitting data is selected after the MAC links are sorted according to measurement quantities reported on each MAC link; and/or, whether to activate SN switching is determined according to data transmitting information of each MAC link.

In an embodiment, when transmitting data, a total quantity of data to be transmitted via each MAC link is determined according to buffer occupancy (BO) condition and a data transmission rate reported by each MAC, and a quantity of data received by the L3 from an upper layer.

In an embodiment, when switching the SN of data to be transmitted via the MAC link, a preceding MAC link and a succeeding MAC link corresponding to data of the MAC link are determined according to a received MAC link selection control packet, and the sorting is performed according to the MAC link selection control packet.

In an embodiment, when switching the SN of data to be transmitted via the MAC link, the processor 900 is further configured to implement:

transmitting a link selection control PDU and data packets to the MAC link when transmitting data, wherein the link selection control PDU is inserted at the beginning of a data cluster, and encompasses a preceding data cluster and a succeeding data cluster corresponding to the data cluster.

In an embodiment, when receiving data in an HARQ process, each data packet received in the HARQ process carries a preceding HARQ process ID corresponding to the data packet.

In an embodiment, when transmitting data, an SN length corresponding to a transmitting window and a receiving window is determined according to a data transmission rate and a service QoS property.

In an embodiment, the data transmission is performed by an L3 UP.

In FIG. 9, a bus architecture may include any number of interconnected buses and bridges, and connects various circuits including one or more processors represented by the processor 900 and memory represented by the memory 920. The bus architecture may also connect various other circuits such as peripherals, voltage regulators and power management circuits, which is well known in the art. Therefore, a detailed description thereof is omitted herein. A bus interface provides an interface. The transceiver 910 may be multiple elements, i.e., a transmitter and a receiver, to allow for communication with various other apparatuses on the transmission medium. The processor 900 is responsible for supervising the bus architecture and normal operation and the memory 920 may store the data being used by the processor 900 during operation.

An embodiment of the present disclosure further provides a data transmission apparatus. The data transmission apparatus is located in L3, and includes:

a control module, configured to determine data to be transmitted via an MAC link, wherein a quantity of the data to be transmitted is determined such that a data buffer of an MAC function entity meets a transmission rate of the MAC link.

In an embodiment, the control module is further configured to transmit corresponding data via the MAC link after the quantity of the data to be transmitted is determined according to data transmitting and receiving information on the MAC link.

In an embodiment, when the control module is configured to transmit corresponding data via the MAC link after the quantity of the data to be transmitted is determined according to data transmitting and receiving information on the MAC link, the control module is configured to:

receive data transmitting status information transmitted by each MAC link; and adjust, according to the data transmitting status information transmitted by each MAC link, data to be transmitted via each MAC link.

In an embodiment, the control module is further configured to receive the data transmitting status information transmitted by the MAC in one of or a combination of following manners:

the data transmitting status information is transmitted according to a status of the data buffer;

the data transmitting status information is transmitted by the MAC periodically;

the data transmitting status information is transmitted in response to a data transmitting request sent by the L3 to the MAC.

In an embodiment, the control module is further configured to, when transmitting data via the MAC link, transmit according to the data transmitting status information transmitted by the MAC, and/or transmit according to data received by the L3 from an upper layer.

In an embodiment, the control module is further configured to transmit, after the data transmitted by the upper layer is received, the received data directly to the MAC, or firstly buffering the received data and then transmitting to the MAC.

In an embodiment, the control module is further configured to transmit, after the data transmitted by the MAC is received and sorted successfully, the received data sequentially to an upper layer.

In an embodiment, the control module is further configured to perform transmission of measurement quantities and data packets separately by using logical channels different from or same as logical channels used by the MAC.

In an embodiment, the control module is further configured to, in case that there are multiple MAC links, select an MAC link and/or switch a sequence number (SN) of data to be transmitted via the MAC link when transmitting data.

In an embodiment, the control module is further configured to: select an MAC link configured for transmitting data after the MAC links are sorted according to measurement quantities reported on each MAC link; and/or, determine whether to activate SN switching according to data transmitting information of each MAC link.

In an embodiment, the control module is further configured to, when transmitting data, determine a total quantity of data to be transmitted via each MAC link according to buffer occupancy (BO) condition and a data transmission rate reported by each MAC, and a quantity of data received from an upper layer.

In an embodiment, the control module is further configured to, when switching the SN of data to be transmitted via the MAC link, determine a preceding MAC link and a succeeding MAC link corresponding to data of the MAC link according to a received MAC link selection control packet, and perform the sorting according to the MAC link selection control packet.

In an embodiment, the control module is further configured to, when switching the SN of data to be transmitted via the MAC link, transmit a link selection control PDU and data packets to the MAC link when transmitting data, wherein the link selection control PDU is inserted at the beginning of a data cluster, and encompasses a preceding data cluster and a succeeding data cluster corresponding to the data cluster.

In an embodiment, the control module is further configured to receive data in an HARQ process, wherein each data packet received in the HARQ process carries a preceding HARQ process ID corresponding to the data packet.

In an embodiment, the control module is further configured to, when transmitting data, determine an SN length corresponding to a transmitting window and a receiving window according to a data transmission rate and a service QoS property.

In an embodiment, the data transmission is performed by an L3 UP.

For convenience of description, various parts of the aforementioned apparatus are divided into various modules or units in terms of function. Certainly, when the embodiments of the present disclosure are implemented, the functions of the various modules or units may be implemented in the same piece of software or hardware, or in multiple pieces of software or hardware.

Figure 10:
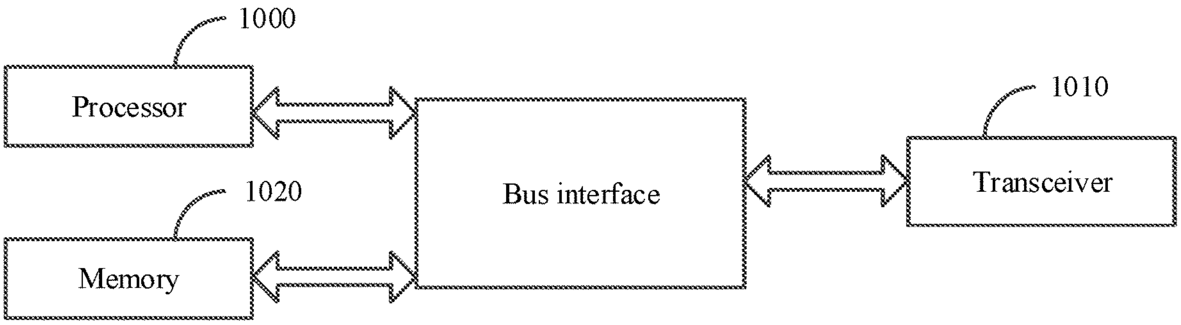
FIG. 10 is another schematic structural diagram of a data transmission apparatus according to an embodiment of the present disclosure.

FIG. 10 is another schematic structural diagram of a data transmission apparatus. The data transmission apparatus is located in MAC, and as shown in FIG. 10, includes:

a processor 1000, configured to read a program in a memory 1020 to implement following step: performing data transmission with an L3 via an MAC link, wherein a quantity of data to be transmitted is determined by the L3, and a quantity of the data to be transmitted is determined such that a data buffer of an MAC function entity meets a transmission rate of the MAC link;

a transceiver 1010, configured to receive and transmit data under the control of the processor 1000.

In an embodiment, the MAC link is an uplink and/or downlink connection link between the L3 and the MAC function entity.

In an embodiment, the MAC transmits data transmitting status information to the L3.

In an embodiment, the data transmitting status information is transmitted in one of or a combination of following manners:

the data transmitting status information is transmitted according to a status of the data buffer;

the data transmitting status information is transmitted by the MAC periodically;

the data transmitting status information is transmitted in response to a data transmitting request sent by the L3 to the MAC.

In an embodiment, when performing the data transmission via the MAC link, the data is transmitted by the L3 according to the data transmitting status information transmitted by the MAC; and/or, the data is transmitted according to data received by the L3 from an upper layer.

In an embodiment, the processor 1000 is further configured to implement: performing transmission of measurement quantities and data packets separately by using logical channels different from or same as logical channels used by the L3.

In an embodiment, the processor 1000 is further configured to implement:

reporting measurement quantities, so that the L3 sorts MAC links according to the measurement quantities reported on each MAC link and selects an MAC link for transmitting data; and/or, transmitting data transmitting information, so that the L3 determines whether to activate SN switching according to the data transmitting information of each MAC link.

In an embodiment, the processor 1000 is further configured to implement: reporting BO condition and a data transmission rate, so that the L3, when transmitting data, determines a total quantity of data to be transmitted via each MAC link according to the BO condition and the data transmission rate reported by each MAC, and a quantity of data received by the L3 from an upper layer.

In an embodiment, when the L3 switching an SN of data to be transmitted via the MAC link, the MAC informs, by transmitting an MAC link selection control packet, the L3 of a preceding MAC link and a succeeding MAC link corresponding to data of the MAC link, and to perform sorting according to the MAC link selection control packet.

In an embodiment, when switching an SN of data to be transmitted via the MAC link, the processor 1000 is further configured to implement:

receiving a link selection control PDU and data packets transmitted by the L3, wherein the link selection control PDU is inserted at the beginning of a data cluster, and encompasses a preceding data cluster and a succeeding data cluster corresponding to the data cluster.

In an embodiment, when transmitting data in an HARQ process to the L3, each data packet received in the HARQ process carries a preceding HARQ process ID corresponding to the data packet.

In an embodiment, when transmitting data, an SN length corresponding to a transmitting window and a receiving window is determined according to a data transmission rate and a service QoS property.

In FIG. 10, a bus architecture may include any number of interconnected buses and bridges, and connects various circuits including one or more processors represented by the processor 1000 and memory represented by the memory 1020. The bus architecture may also connect various other circuits such as peripherals, voltage regulators and power management circuits, which is well known in the art. Therefore, a detailed description thereof is omitted herein. A bus interface provides an interface. The transceiver 1010 may be multiple elements, i.e., a transmitter and a receiver, to allow for communication with various other apparatuses on the transmission medium. The processor 1000 is responsible for supervising the bus architecture and normal operation and the memory 1020 may store the data being used by the processor 1000 during operation.

An embodiment of the present disclosure further provides a data transmission apparatus. The data transmission apparatus is located in MAC, and includes:

a transmission module, configured to perform data transmission with an L3 via an MAC link, wherein a quantity of data to be transmitted is determined by the L3, and a quantity of the data to be transmitted is determined such that a data buffer of an MAC function entity meets a transmission rate of the MAC link.

In an embodiment, the MAC link is an uplink and/or downlink connection link between the L3 and the MAC function entity.

In an embodiment, the transmission module is further configured to transmit data transmitting status information to the L3.

In an embodiment, the transmission module is further configured to transmit the data transmitting status information in one of or a combination of following manners:

transmit the data transmitting status information according to a status of the data buffer;

transmit the data transmitting status information periodically;

transmit the data transmitting status information in response to a data transmitting request sent by the L3 to the MAC.

In an embodiment, the transmission module is further configured to perform the data transmission via the MAC link, wherein the data is transmitted by the L3 according to the data transmitting status information transmitted by the MAC; and/or, the data is transmitted according to data received by the L3 from an upper layer.

In an embodiment, the transmission module is further configured to perform transmission of measurement quantities and data packets separately by using logical channels different from or same as logical channels used by the L3.

In an embodiment, the transmission module is further configured to:

report measurement quantities, so that the L3 sorts MAC links according to the measurement quantities reported on each MAC link and selects an MAC link for transmitting data; and/or, transmit data transmitting information, so that the L3 determines whether to activate SN switching according to the data transmitting information of each MAC link.

In an embodiment, the transmission module is further configured to report BO condition and a data transmission rate, so that the L3, when transmitting data, determines a total quantity of data to be transmitted via each MAC link according to the BO condition and the data transmission rate reported by each MAC, and a quantity of data received by the L3 from an upper layer.

In an embodiment, the transmission module is further configured to, when the L3 switching an SN of data to be transmitted via the MAC link, inform, by transmitting an MAC link selection control packet, the L3 of a preceding MAC link and a succeeding MAC link corresponding to data of the MAC link, and to perform sorting according to the MAC link selection control packet.

In an embodiment, the transmission module is further configured to, when switching an SN of data to be transmitted via the MAC link, receive a link selection control PDU and data packets transmitted by the L3, wherein the link selection control PDU is inserted at the beginning of a data cluster, and encompasses a preceding data cluster and a succeeding data cluster corresponding to the data cluster.

In an embodiment, the transmission module is further configured to transmit data in an HARQ process to the L3, wherein each data packet received in the HARQ process carries a preceding HARQ process ID corresponding to the data packet.

In an embodiment, the transmission module is further configured to, when transmitting data, determine an SN length corresponding to a transmitting window and a receiving window according to a data transmission rate and a service QoS property.

An embodiment of the present disclosure further provides a computer readable storage medium stores a computer program, wherein the computer program is configured to be executed by a processor to implement the aforementioned data transmission method.

For specific implementations, references may be made to the implementations of the data transmission method on the L3 UP side and/or the MAC side.

In summary, the technical solutions provided by the embodiments of the present disclosure provide a data transmission solution for L3 UP, thereby the L3 UP is responsible for allocating for each MAC link a quantity of the data to be transmitted, and the L3 UP has a data flow control function.

Additionally, the technical solutions provided by the embodiments of the present disclosure provide an interaction solution between the MAC and the L3 UP and a solution for the L3 UP to allocate a quantity of transmission data, such that the MAC can measure the receiving and transmitting of air interface data and transmit the measurement information to the L3 UP, and such that the L3 UP can perform flow controlling based on these measurement information.

Besides, the technical solutions provided by the embodiments of the present disclosure provide a solution for the MAC to sort data. Specifically, the MAC may perform sorting by using SN, or perform sorting based on the random order of HARQ process, or perform sorting based on a combination of SN and the random order of HARQ process; and the MAC is capable of judging whether to activate an SN sorting window.

The aforementioned solutions provide a solution to the problem related to MAC link when the L3 UP selects an MAC link.

More specifically, with the technical solutions provided by the embodiments of the present disclosure, at least one of or a combination of following effects can be achieved:

a flow controlling between MAC and L3 UP can be implemented;

L3 UP can select, according to the link quality, different MACs to transmit data;

L3 UP can select an air interface according to a channel quality, thereby improving data transmitting efficiency.

Since the MAC link control PDU of L3 UP can be used, the flexibility in link selection is increased.

A person skilled in the art can understand that embodiments of the present disclosure may be provided as a method, system, or computer program product. Accordingly, the present disclosure may take the form of an entirely hardware embodiment, an entirely software embodiment, or an embodiment combining software and hardware aspects. Furthermore, the present disclosure may take the form of a computer program product configured to be implemented on one or more computer-usable storage media (including but not limited to disk storage, optical storage, etc.) storing computer-usable program codes therein.

The present disclosure is described with reference to flowcharts and/or block diagrams of methods, devices (systems), and computer program products according to the embodiments of the disclosure. It will be understood that each process and/or block in the flowcharts and/or block diagrams, and combinations of processes and/or blocks in the flowcharts and/or block diagrams, can be implemented by computer executable instructions. These computer executable instructions may be provided to the processor of a general-purpose computer, special purpose computer, embedded processor or other programmable data processing device to produce a machine, such that the instructions executed by the processor of the computer or other programmable data processing device produce an apparatus for implementing the functions specified in one or more processes in the flowcharts and/or one or more blocks in the block diagrams.

These computer program instructions may also be stored in a computer-readable storage capable of directing a computer or other programmable data processing device to operate in a specific manner, such that the instructions stored in the computer-readable storage produce an article of manufacture including instruction means, the instruction means implements the functions specified in one or more processes of the flowchart and/or one or more blocks of the block diagram.

These computer program instructions can also be loaded onto a computer or other programmable data processing device, so that a series of operational steps can be performed on the computer or other programmable device to produce a computer-implemented process, the instructions executed on the computer or other programmable devices thus provide steps for realizing the functions specified in one or more processes of the flowchart and/or one or more blocks of the block diagram.

Obviously, a person skilled in the art may make various variations and modifications in the embodiments of the present disclosure without departing from the sprite and scope of the present disclosure. In this way, if these variations and modifications fall within the scope of the claims and their equivalents, the present disclosure is also intended to cover these variations and modifications.

What is claimed is:

1. A sequence number (SN) switching method for data transmission, performed by a layer 3 user plane (L3 UP), wherein the L3 UP is a function entity in L3, comprising:

determining data to be transmitted via a medium access control (MAC) link, wherein a quantity of the data to be transmitted is determined such that a data buffer of an MAC function entity meets a transmission rate of the MAC link, the MAC link is an uplink and/or downlink connection link between the L3 UP and the MAC function entity, the method further comprises:

in case that there are multiple MAC links, switching a SN of data to be transmitted via the MAC link when transmitting data, when switching the SN of data to be transmitted via the MAC link, a preceding MAC link and a succeeding MAC link corresponding to data of the MAC link are determined according to a received MAC link selection control packet, and the sorting is performed according to the MAC link selection control packet.

2. The SN switching method for data transmission according to claim 1, further comprising:

transmitting corresponding data via the MAC link after the quantity of the data to be transmitted is determined according to data transmitting and receiving information on the MAC link.

3. The SN switching method for data transmission according to claim 2, wherein the transmitting corresponding data via the MAC link after the quantity of the data to be transmitted is determined according to data transmitting and receiving information on the MAC link comprises:

receiving data transmitting status information transmitted by each MAC link; and adjusting, according to the data transmitting status information transmitted by each MAC link, data to be transmitted via each MAC link.

4. The SN switching method for data transmission according to claim 3, wherein the data transmitting status information is transmitted by the MAC in one of or a combination of following manners:

the data transmitting status information is transmitted according to a status of the data buffer;

the data transmitting status information is transmitted by the MAC periodically;

the data transmitting status information is transmitted in response to a data transmitting request sent to the MAC.

5. The SN switching method for data transmission according to claim 3, wherein the determining data to be transmitted via the MAC link is performed according to the data transmitting status information transmitted by the MAC, and/or the determining data to be transmitted via the MAC link is performed according to data received by the L3 UP from an upper layer.

6. The SN switching method for data transmission according to claim 3, further comprising:

after the data transmitted by the upper layer is received, transmitting the received data directly to the MAC, or firstly buffering the received data and then transmitting to the MAC.

7. The SN switching method for data transmission according to claim 3, further comprising:

after the data transmitted by the MAC is received, transmitting the received data sequentially to an upper layer.

8. The SN switching method for data transmission according to claim 1, further comprising:

performing transmission of measurement quantities and data packets by using logical channels different from or same as logical channels used by the MAC.

9. The SN switching method for data transmission according to claim 1, further comprising:

in case that there are multiple MAC links, selecting an MAC link when transmitting data.

10. The SN switching method for data transmission according to claim 9, wherein an MAC link for transmitting data is selected after the MAC links are sorted according to measurement quantities reported on each MAC link; and/or, whether to activate SN switching is determined according to data transmitting information of each MAC link.

11. The SN switching method for data transmission according to claim 9, wherein, when transmitting data, a total quantity of data to be transmitted via each MAC link is determined according to buffer occupancy (BO) condition and a data transmission rate reported by each MAC, and a quantity of data received by the L3 UP from an upper layer.

12. The SN switching method for data transmission according to claim 9, wherein, when receiving data in a hybrid automatic repeat request (HARQ) process, each data packet received in the HARQ process carries a preceding HARQ process identifier (ID) corresponding to the data packet.

13. The SN switching method for data transmission according to claim 1, wherein, when switching the SN of data to be transmitted via the MAC link, the method further comprises:

transmitting a link selection control protocol data unit (PDU) and data packets to the MAC link when transmitting data, wherein the link selection control PDU is inserted at the beginning of a data cluster, and encompasses a preceding data cluster and a succeeding data cluster corresponding to the data cluster.

14. The SN switching method for data transmission according to claim 1, wherein, when transmitting data, an SN length corresponding to a transmitting window and a receiving window is determined according to a data transmission rate and a service quality of service (QoS) property.

15. A sequence number (SN) switching apparatus for data transmission, located in a layer 3 user plane (L3 UP), wherein the L3 UP is a function entity in L3, comprising:

a processor, configured to read a program in a memory to implement the SN switching method for data transmission according to claim 1.

16. A sequence number (SN) switching method for data transmission, applied to a medium access control (MAC) function entity, comprising:

performing data transmission with a layer 3 user plane (L3 UP) via an MAC link, wherein a quantity of data to be transmitted is determined by the L3 UP, and a quantity of the data to be transmitted is determined such that a data buffer of an MAC function entity meets a transmission rate of the MAC link, the MAC link is an uplink and/or downlink connection link between the L3 UP and the MAC function entity, the L3 UP is a function entity in L3, the method further comprises:

in case that there are multiple MAC links, switching a SN of data to be transmitted via the MAC link by the L3 UP when transmitting data, when switching the SN of data to be transmitted via the MAC link, a preceding MAC link and a succeeding MAC link corresponding to data of the MAC link are determined by the L3 UP according to a received MAC link selection control packet, and the sorting is performed by the L3 UP according to the MAC link selection control packet.

17. The SN switching method for data transmission according to claim 16, further comprising:

transmitting data transmitting status information to the L3 UP.

18. The SN switching method for data transmission according to claim 17, wherein the data transmitting status information is transmitted in one of or a combination of following manners:

the data transmitting status information is transmitted according to a status of the data buffer;

the data transmitting status information is transmitted periodically;

the data transmitting status information is transmitted in response to a data transmitting request sent by the L3 UP.

19. A sequence number (SN) switching apparatus for data transmission, located in a medium access control (MAC) function entity, comprising:

a processor, configured to read a program in a memory to implement the SN switching method for data transmission according to claim 16.

* * * * *